(12) United States Patent
Yohe et al.

(10) Patent No.: US 7,359,926 B1
(45) Date of Patent: Apr. 15, 2008

(54) SYSTEM FOR OPTIMIZATION OF DATABASE REPLICATION/SYNCHRONIZATION

(75) Inventors: Thomas P. Yohe, Dayton, OH (US); Brian C. Morris, Austin, TX (US)

(73) Assignee: Stampede, Technologies, Inc., Dayton, OH (US)

( * ) Notice: Subject to any disclaimer, the term of this patent is extended or adjusted under 35 U.S.C. 154(b) by 447 days.

(21) Appl. No.: 10/367,250

(22) Filed: Feb. 13, 2003

(51) Int. Cl.
 *G06F 17/30* (2006.01)
(52) U.S. Cl. .................. 707/204; 707/205; 707/203
(58) Field of Classification Search .............. 707/200, 707/204; 709/205, 212
See application file for complete search history.

(56) References Cited

U.S. PATENT DOCUMENTS

| | | | |
|---|---|---|---|
| 5,787,262 A | 7/1998 | Shakib et al. | |
| 5,794,253 A | 8/1998 | Norin et al. | |
| 5,864,851 A | 1/1999 | Breitbart et al. | |
| 5,999,931 A | 12/1999 | Breitbart et al. | |
| 6,049,809 A | 4/2000 | Raman et al. | |
| 6,163,811 A | 12/2000 | Porter | |
| 6,205,481 B1 | 3/2001 | Heddaya et al. | |
| 6,253,211 B1 | 6/2001 | Gillies et al. | |
| 6,304,882 B1 | 10/2001 | Strellis et al. | |
| 6,318,124 B1 | 11/2001 | Rutherford et al. | |
| 6,345,308 B1 | 2/2002 | Abe | |
| 6,405,219 B2 | 6/2002 | Saether et al. | |
| 6,457,011 B1 | 9/2002 | Brace et al. | |
| 6,516,327 B1 | 2/2003 | Zondervan et al. | |
| 6,889,247 B2 * | 5/2005 | Christie et al. ............. 709/205 |

* cited by examiner

*Primary Examiner*—Wilson Lee
*Assistant Examiner*—Sheree N Brown
(74) *Attorney, Agent, or Firm*—R. William Graham

(57) ABSTRACT

A system for optimization of database replication/synchronization includes a first computer-based device having software thereon for obtaining a state of condition a database object and associating a unique identifier with such database object, for altering form of the data and associating another unique identifier with such altered database object, and for determining the database object using the unique identifiers. The system can receive a replication request for updating data from a second computer for a database object on the second computer wherein the request contains a unique identifier comparatively equating to one of the identifiers on the first computer and sends either an instruction to second computer to perform a like alteration on the data or to send the changes to the database object.

11 Claims, 3 Drawing Sheets

Sharing data between databases in different locations by transferring database updates so that two or more replicas stay synchronized

SYSTEM FOR OPTIMIZATION OF DATABASE REPLICATION/SYNCHRONIZATION

BACKGROUND OF THE INVENTION

1. Field of the Invention

The present invention relates to a system for optimizing database replication/synchronization.

2. Related Art

Database replication is a process for synchronizing data updates between databases in different locations. Database replication includes transferring updates between servers so that two or more copies of the database remain synchronized. Each copy of the database is called a replica, and each contains a common set of documents (Tables, views, forms, reports, macros, and modules). Database servers can exchange updates of data or replicable objects to keep replicas synchronized. This exchange is called replication. Database replications allow users at different locations to work on their own copy and share and synchronize their changes. In the case of an application for multiple users, database replication can improve the way users share data.

Each member of the replica set contains a common set of replicable objects. Each replica can also contain local objects, in other words, objects that are synchronized during replication and objects that remain on the local computer and are not replicated. This allows one copy of a database to be customized for a specific group or users while still synchronizing common data with other members in the replica set.

Replication is common for accessing data, wherein a replica of a database on a remote computer connects a server computer so that synchronization of changes made to the replica on the remote computer can be made with changes on a database. One traditional approach to replication/synchronization would be to create a single database that contains both the data and the objects, and then make replicas of the database for each computer.

Although database replication can solve many of the problems inherent in distributed-database processing, current replication techniques require improvement due to inherent inefficiencies. For example, the replication can be time consuming and costly in cases where there are a large number of updates where the updates consist of a transformation of the replicable objects (an example of a transform would be to convert the object into a compressed format), or applications that require frequent updates of existing records in different replicas are likely to have more record conflicts than applications that simply insert new records in a database, or applications with many record conflicts require more administrative time because the conflicts must be resolved manually.

What is needed is an improved replication/synchronization process which decreases the computer usage time and cost. The present invention fulfills this and other needs.

BRIEF SUMMARY OF THE INVENTION

It is an object to improve the database replication/synchronization.

It is another object to accelerate replication/synchronization.

It is still another object to provide a replication/synchronization system which can be employed on a variety of platforms and interfaces with various programs.

Accordingly, the present invention is directed to a system for optimization of database replication/synchronization. The system includes a first computer-based device having software thereon with means for obtaining a state of condition a database object and associating a unique identifier with such database object, means for altering form of the data in the database object and associating another unique identifier with such altered database object, and means for determining the database object using the unique identifiers. Also, provided are means for receiving a replication request from a second computer for updated data relating to a database object thereon and containing a unique identifier and comparatively equating to one of the identifiers on the first computer and for sending either an instruction to the second computer to perform a like alteration on the data or to send the changes to the database object. The alteration can include a transformation operation, such as compression, expansion, encryption, de-encryption, conversion, de-conversion. The unique identifier can be a sequence number and modification time, for example. The invention presumes the installation of the software be installed on both computers. A method employing the above is also provided.

Other objects and advantages will be readily apparent to those skilled in the art upon viewing the drawings and reading the detailed description hereafter.

DETAILED DESCRIPTION OF THE INVENTION

Figure 1:
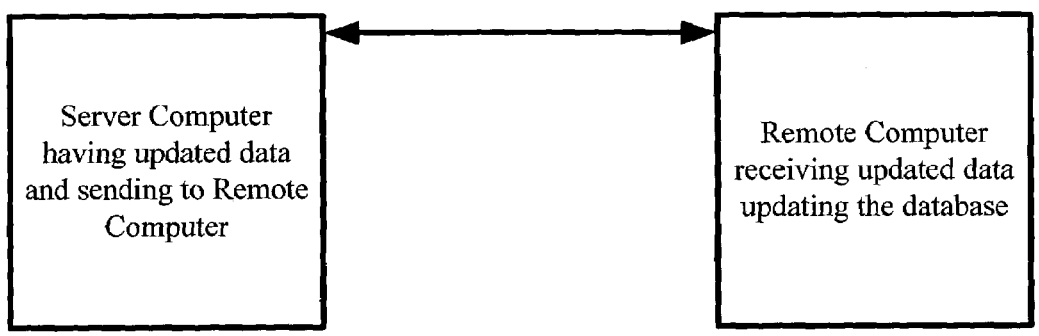
FIG. 1 is a block diagram of the state of the prior art.
Figure 2:
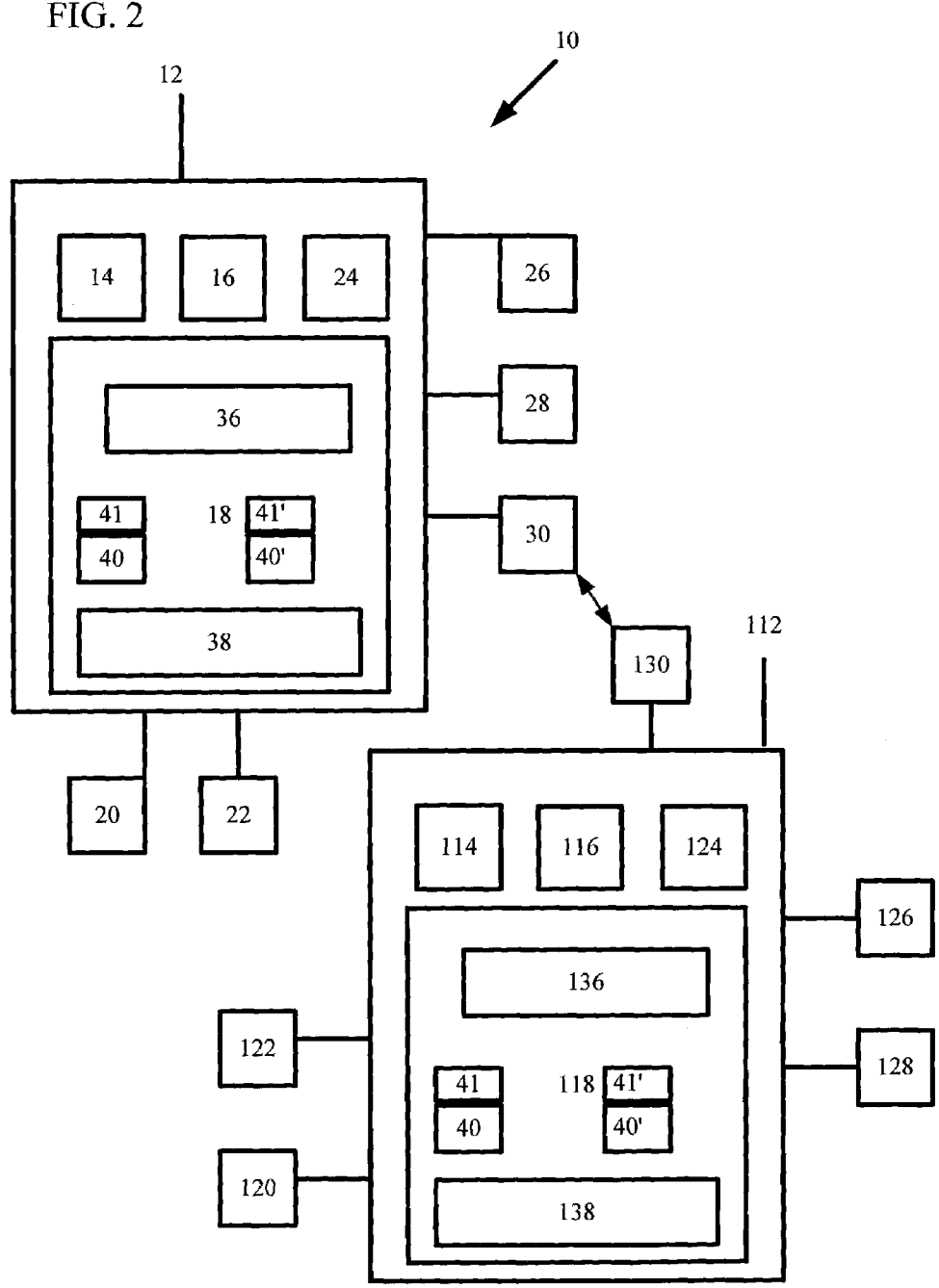
FIG. 2 is a block diagram of the present invention.

Referring now to the drawings, the system of the preferred embodiment of the present invention is generally referred to by the numeral 10. The system 10 includes a computer which is capable of running standard operating system such as Windows, Linux, or Unix.

The system 10 includes a conventional computer 12 having a central processor (CPU) 14, random memory 16, permanent memory 18 (e.g., hard or fixed disk, optical disk, magneto-optical disk, or flash memory), and can include a keyboard 20, a mouse 22 (or like pointing device), a clock 24 and a display or screen device 26. Processor 14 is operably associated with memory 16 for storing frequently accessed information. One or more input/output device(s) 28, such as a printer can be included. The CPU 12 includes a communication link 30 which can be a LAN, WAN or modem connection, for example.

Operably residing on the CPU 12 is operating software 36 as is known in the art. The operating software 36 is preferably stored in memory 18, and includes a one or more application programs, such as client application software or programs loaded thereon which can execute in a manner as is known in the art. Additionally, the CPU 12 can include one or more applications loaded thereon, such as Microsoft Outlook® or Lotus Notes®.

The present invention further provides for replication/synchronization software 38 thereon having the ability to obtain a state of condition a database object 40 stored in memory 18 and associating a unique identifier 41 with such database object 40. The software 38 is further capable of altering the form of the data 40 thus providing database object 40' and associating another unique identifier 41' with such altered database object 40' which is also stored in the memory 18.

The software 38 is thereafter capable of determining whether the database object to be replicated is either in an unaltered form 40 or an altered form 40' using the unique identifiers 41 and 41'. Another feature of the software 38 is that it is capable of receiving a replication request from another computer 112, e.g., remote pc, for one of the database objects 40 or 40', wherein the request contains one of the unique identifiers 41 or 41', for example, and comparatively equating to one of the identifiers on the first computer 12. Similarly, the computer (CPU) 112 has a central processor 114, random memory 116, permanent memory 118, and can include a keyboard 120, a mouse 122, a clock 124 and a display or screen device 126, input/output device(s) 128, and a communication link 130, for example. Similarly, residing on the CPU 112 is operating software 136 and includes one or more applications as above and complementary replication/synchronization software 138 which operates in a manner as described for replication/synchronization software 38 herein.

Replication/synchronization software 38 is capable of sending (or receiving) either an instruction to replication/synchronization software 138 on computer 112 to perform a like alteration on the database object or to send (or receive) the changes to the database object. The alteration can include a transformation operation, such as compression, expansion, encryption, de-encryption, conversion, de-conversion. The unique identifier can be a sequence number and modification time should be unique for this data, for example. For example, in the case of compression, the database object 40 can be compressed to provide a compressed database object 40' which is given a unique identifier 41'. The software 38 stores the file in a compressed format and provides for a decompression utility in order to access the compressed database object 40.

Conventionally, the internal structure of the compressed database object 40' is not maintained in a manner which can necessarily be used to for a replication process between computers 12 and 112. An objective of this invention is to allow the replication/synchronization process to proceed when possible without the need for transferring the data between computers 12 and 112. This significantly reduces the traffic of over the network in which these computers are commonly employed. This is enabled by the use of the unique identifiers 41 and 41' which are created and used by software 38 and 138.

With the instant invention, the internal format of the database objects can be dynamically modified in a manner so that it replicates without having to invoke traditional industry standard replication techniques. This reduces the time and network bandwidth consuming step.

Figure 3:
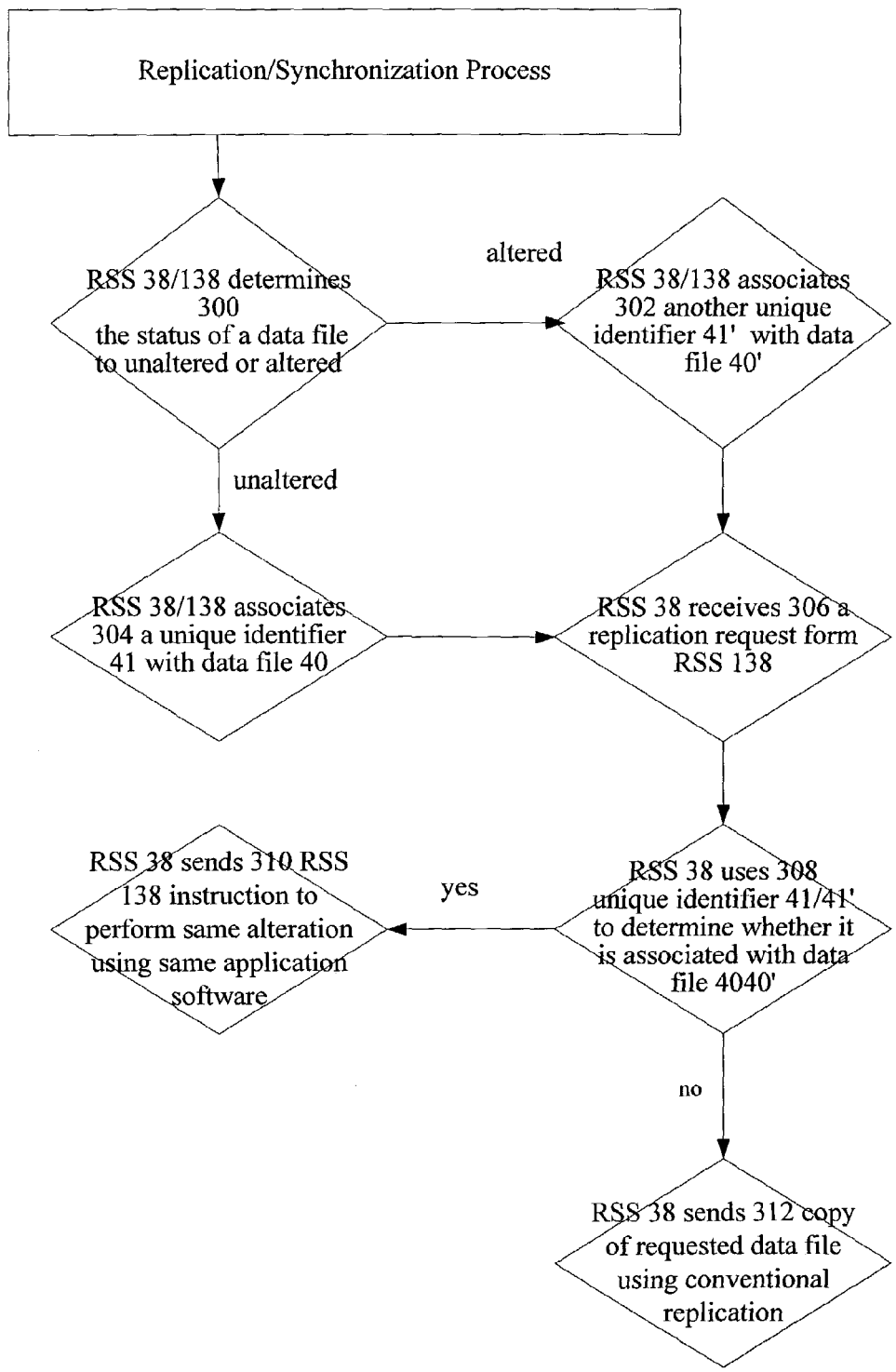
FIG. 3 is a flow chart of another operation of the present invention.

FIG. 3 depicts a flow chart of the replication/synchronization system 38/138. Replication/synchronization software (RSS) 38/138 determines 300 the status of a database object to unaltered or altered. If altered, RSS 38/138 associates 302 another unique identifier 41' with database object 40'. If unaltered. RSS 38/138 associates 304 a unique identifier 41 with database object 40. RSS 38 receives 306 a replication request from RSS 138. RSS 38 uses 308 unique identifier 41/41' to determine whether it is associated with database object 40/40'. If yes, RSS 38 sends 310 RSS 138 an instruction to perform same alteration using same application software. If no, RSS 38 sends 312 copy of requested database object using conventional replication.

The present invention is not intended to be limited to any particular architecture, application or particular environment. However, by way of example, the present invention will describe the implementation of the invention in a Lotus Notes/Domino environment. Persons skilled in the art will find that the system and methods of the present invention may be advantageously applied to a variety of other systems and application software, including database management systems, e-mail software, web browsers or any application where the existence of a file attachment is denoted graphically, and the like.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A system for optimization of database replication/synchronization, including:
   a first computer-based device having software thereon with means for associating a first unique identifier with a first database object;
   means for performing a first alteration upon said first database object to provide an altered second database object and associating a second unique identifier with said altered second database object, wherein said first alteration includes a transformation operation comprising compression, expansion, encryption, de-encryption, conversion, and de-conversion;
   means for determining said database objects to be replicated either in altered form or unaltered form using said unique identifiers; and
   means for receiving a replication request for updating data for a third database object from a second computer based device containing a third unique identifier and comparatively equating said third unique identifier to one of said first and second identifiers and for sending an instruction to said second computer based device to perform said first alteration upon said third database object thereon to maintain said database objects in sync and for sending said requested updated data when said second computer lacks means for performing said first alteration.

2. The system of claim 1, wherein said unique identifier includes a sequence number.

3. The system of claim 1, wherein said second computer-based device has complementary software thereon with means for associating a third unique identifier with condition of said third database object thereon;
   means for performing a second alteration upon said third database object to provide an altered fourth database object thereon and associating a fourth unique identifier with said fourth altered database object, wherein said second alteration includes a transformation operation comprising compression, expansion, encryption, de-encryption, conversion, and de-conversion determining said database object using said unique identifiers, and
   means for receiving a replication request from said first computer for updating data and containing one of said first and second unique identifiers and comparatively equating to one of said other identifiers and for sending an instruction to said first computer based device to perform said second alteration upon data thereon to maintain said database objects in sync.

4. The system of claim 1, wherein said replication/synchronization is characterized to be performed transparent to a user.

5. A method for optimization of database replication/synchronization, including:
- employing a first computer-based device having software thereon with means associating a first unique identifier with a first database object;
- performing a first alteration upon said first database object to provide an altered second database object, wherein said first alteration includes a transformation operation comprising at least one of compression, expansion, encryption, de-encryption, conversion, and de-conversion;
- associating a second unique identifier with said altered second database object;
- determining said database objects to be replicated either in altered form or unaltered form using said unique identifiers; and
- receiving a replication request for updating data for a third database object from a second computer containing a third unique identifier and comparatively equating said third unique identifier to one of said first and second identifiers and for sending an instruction to said second computer based device to perform said first alteration upon of said third database object thereon to maintain said database objects in sync and for sending said requested updated data when said second computer lacks means for performing said first alteration.

6. The method of claim 5, wherein said unique identifier includes a sequence number.

7. The method of claim 5, wherein said second computer-based device has complementary software thereon with and includes the step of associating a third unique identifier with said third database object thereon;
- performing a second alteration upon said third database object to provide an altered fourth database object thereon and associating a fourth unique identifier with said fourth altered database object, wherein said second alteration includes a transformation operation comprising at least one of compression, expansion, encryption, de-encryption, conversion, and de-conversion;
- determining said database objects to be replicated either in altered form or unaltered form using said unique identifiers; and
- receiving a replication request from said first computer for updating data and containing one of said first and second unique identifiers and comparatively equating to one of said other identifiers and for sending an instruction to said first computer based device to perform said second alteration upon data thereon to maintain said database objects in sync.

8. The method of claim 5, wherein said replication/synchronization is characterized to be performed transparent to a user.

9. A system for optimization of database replication/synchronization, including:
- a first computer-based device having software thereon with means for associating a first unique identifier with a first database object;
- means for performing a first alteration upon said first database object to provide an altered second database object and associating a second unique identifier with said altered second database object, wherein said first alteration includes a transformation operation comprising at least one of compression, expansion, encryption, de-encryption, conversion, and de-conversion;
- means for determining said database objects to be replicated either in altered form or unaltered form using said unique identifiers; and
- means for receiving a replication request for updating data for a third database object from a second computer based device containing a third unique identifier and comparatively equating said third unique identifier to one of said first and second identifiers and for sending an instruction to said second computer based device to perform said first alteration upon said third database object thereon to maintain said database objects in sync and for sending said requested updated data when said second computer lacks means for performing said first alteration.

10. The system of claim 9, wherein said second computer-based device has complementary software thereon with means for associating a third unique identifier with said third database object thereon;
- means for performing a second alteration upon said third database object to provide an altered fourth database object thereon and associating a fourth unique identifier with said fourth altered database object, wherein said second alteration includes a transformation operation comprising at least one of compression, expansion, encryption, de-encryption, conversion, and de-conversion determining said database object using said unique identifiers, and
- means for receiving a replication request from said first computer for updating data and containing one of said first and second unique identifiers and comparatively equating to one of said other identifiers and for sending an instruction to said first computer based device to perform said second alteration upon data thereon to maintain said database objects in sync.

11. The system of claim 9, wherein said replication/synchronization is characterized to be performed transparent to a user.

* * * * *